United States Patent
Satish

(10) Patent No.: US 7,620,983 B1
(45) Date of Patent: Nov. 17, 2009

(54) BEHAVIOR PROFILING

(75) Inventor: Sourabh Satish, Mountain View, CA (US)

(73) Assignee: Symantec Corporation, Cupertino, CA (US)

( * ) Notice: Subject to any disclaimer, the term of this patent is extended or adjusted under 35 U.S.C. 154(b) by 667 days.

(21) Appl. No.: 10/802,672

(22) Filed: Mar. 16, 2004

(51) Int. Cl.
G06F 11/00 (2006.01)
G06F 15/16 (2006.01)

(52) U.S. Cl. ......................................... 726/22; 709/229
(58) Field of Classification Search ............. 726/22–25; 709/229
See application file for complete search history.

(56) References Cited

U.S. PATENT DOCUMENTS

| | | | |
|---|---|---|---|
| 6,553,461 B1 * | 4/2003 | Gupta et al. ................. | 711/137 |
| 6,959,320 B2 * | 10/2005 | Shah et al. ................... | 709/203 |
| 7,096,499 B2 * | 8/2006 | Munson ........................ | 726/23 |
| 7,143,392 B2 * | 11/2006 | Ii et al. ........................ | 717/125 |
| 2002/0147509 A1 * | 10/2002 | Sameshima et al. ........... | 700/32 |
| 2002/0147923 A1 * | 10/2002 | Dotan .......................... | 713/200 |
| 2003/0079179 A1 * | 4/2003 | Brown et al. ................ | 715/501.1 |
| 2004/0143749 A1 * | 7/2004 | Tajalli et al. ................. | 713/200 |
| 2005/0038981 A1 * | 2/2005 | Connor et al. ................ | 713/1 |
| 2005/0086500 A1 * | 4/2005 | Albornoz ..................... | 713/188 |

\* cited by examiner

*Primary Examiner*—Kimyen Vu
*Assistant Examiner*—Suman Debnath
(74) *Attorney, Agent, or Firm*—Hunton & Williams LLP

(57) ABSTRACT

Providing security comprises accessing a database configured to store operational information associated with a process, determining a first behavior using the operational information wherein the first behavior is associated with the process, monitoring the process, and comparing a second behavior with the first behavior wherein the second behavior is attempted by the process.

15 Claims, 4 Drawing Sheets

| | |
|---|---|
| 1 | CMD.EXE |
| 2 | \DEVICE\HARDDISKVOLUME1\WINDOWS\SYSTEM32\NTDLL.DLL |
| 3 | \DEVICE\HARDDISKVOLUME1\WINDOWS\SYSTEM32\KERNEL32.DLL |
| 4 | \DEVICE\HARDDISKVOLUME1\WINDOWS\SYSTEM32\UNICODE.NLS |
| 5 | \DEVICE\HARDDISKVOLUME1\WINDOWS\SYSTEM32\LOCALE.NLS |
| 6 | \DEVICE\HARDDISKVOLUME1\WINDOWS\SYSTEM32\SORTTBLS.NLS |
| 7 | \DEVICE\HARDDISKVOLUME1\WINDOWS\SYSTEM32\MSVCRT.DLL |
| 8 | \DEVICE\HARDDISKVOLUME1\WINDOWS\SYSTEM32\CMD.EXE |
| 9 | \DEVICE\HARDDISKVOLUME1\WINDOWS\SYSTEM32\USER32.DLL |
| 10 | \DEVICE\HARDDISKVOLUME1\WINDOWS\SYSTEM32\GDI32.DLL |
| 11 | \DEVICE\HARDDISKVOLUME1\WINDOWS\SYSTEM32\ADVAPI32.DLL |
| 12 | \DEVICE\HARDDISKVOLUME1\WINDOWS\SYSTEM32\RPCRT4.DLL |
| 13 | \DEVICE\HARDDISKVOLUME1\WINDOWS\SYSTEM32\CTYPE.NLS |
| 14 | \DEVICE\HARDDISKVOLUME1\WINDOWS\SYSTEM32\CONFIG\SYSTEM |
| 15 | \DEVICE\HARDDISKVOLUME1\$MFT |
| 16 | \DEVICE\HARDDISKVOLUME1 |
| 17 | \DEVICE\HARDDISKVOLUME1\ |
| 18 | \DEVICE\HARDDISKVOLUME1\WINDOWS\ |
| 19 | )\DEVICE\HARDDISKVOLUME1\WINDOWS\SYSTEM32\ |
| 20 | SCCA |
| 21 | (tO |
| 22 | {tO |

Figure 3

BEHAVIOR PROFILING

CROSS REFERENCE TO RELATED APPLICATIONS

This application is related to co-pending U.S. patent application Ser. No. 10/782,396 entitled RISK PROFILING filed Feb. 18, 2004, which is incorporated herein by reference for all purposes.

FIELD OF THE INVENTION

The present invention relates generally to security. More specifically, a computer security technique is disclosed.

BACKGROUND OF THE INVENTION

Security is an important issue in modern computer networks. Some intrusion detection programs can be trained to detect suspicious activities and prevent attacks aimed at host computers. The training typically involves observing the operations of processes running on the system or on the network under protection, and modeling normal process behaviors based on the observations. Behaviors that deviate from the models are generally deemed suspicious and may be prevented.

While it is useful to provide security protection using the behavior modeling methods described above, several problems remain. Since the typical intrusion detection program relies on training, until a run-time instance of a process becomes available, typically no behavioral information can be derived and the program usually cannot provide protection to the process. Furthermore, for processes that are running, there is often a long learning cycle during which the intrusion detection programs do not provide protection, thus leaving the system vulnerable to attack. Also, existing programs are typically implemented using large configuration lists to track system behavior and tend to be resource intensive. Furthermore, these existing programs usually do not offer sufficient insight into the risks to which the system is vulnerable. It would be desirable to have a way to offer intrusion detection and protection without requiring extensive learning periods. It would also be useful if such a technique could be efficiently implemented and would provide better risk information.

BRIEF DESCRIPTION OF THE DRAWINGS

Various embodiments of the invention are disclosed in the following detailed description and the accompanying drawings.

FIG. 3 is a table illustrating the component access information included in a prefetch file example.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Computer security techniques are disclosed. In some embodiments, a database configured to store operational information associated with a process is accessed. Allowable behaviors associated with the process are determined using the operational information. The process is monitored for an attempted behavior, which is then compared with the allowable behaviors. In some embodiments, the database includes system optimization information such as prefetch or superfetch information used to facilitate the initialization procedures of processes. In some embodiments, if an attempted behavior is deemed disallowed, appropriate action may be taken. For example the attempted behavior may be prevented from succeeding and an event may be generated in association with the attempted behavior.

Figure 1:
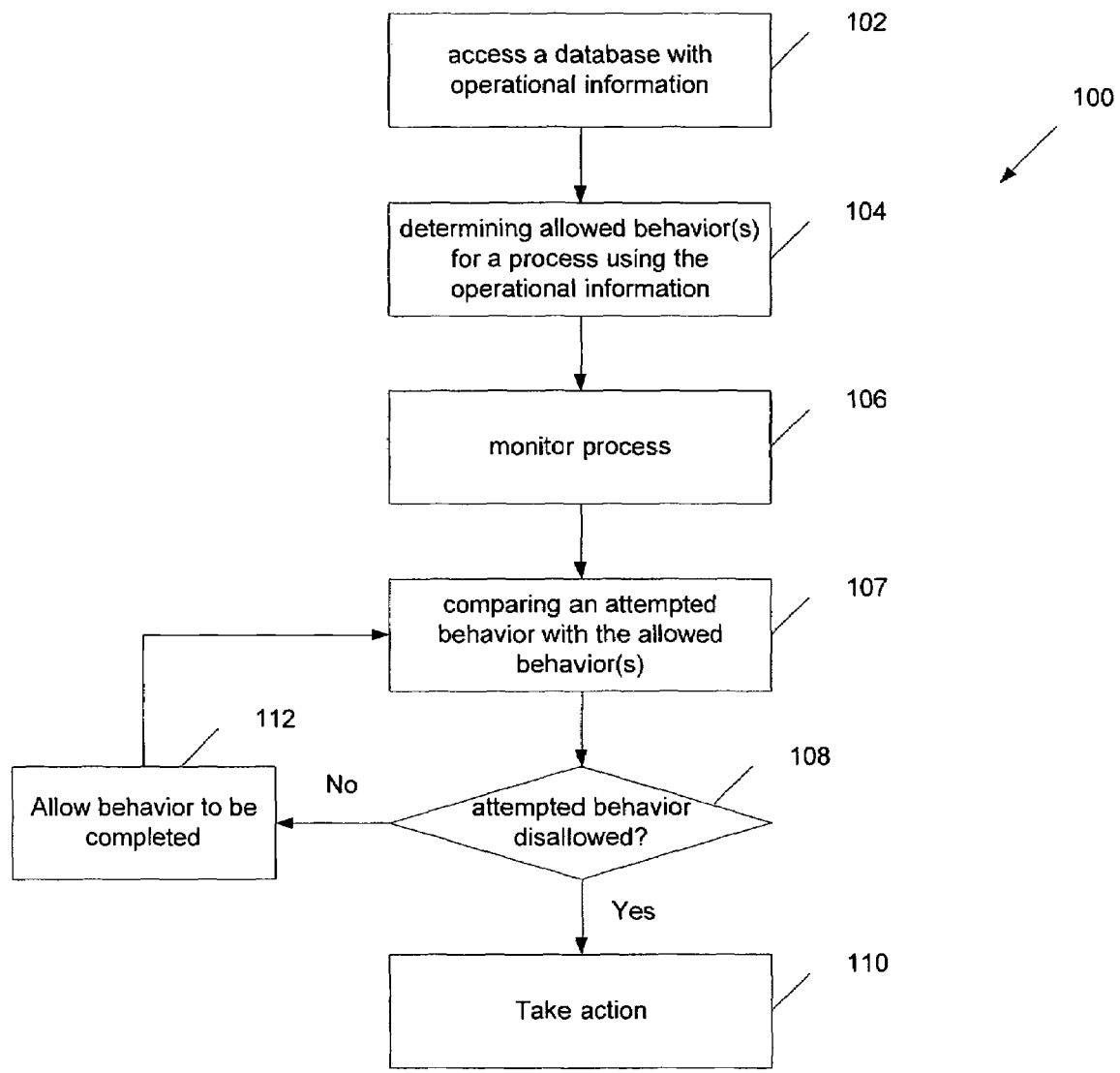
FIG. 1 is a flowchart illustrating a behavior profiling method according to some embodiments.

FIG. 1 is a flowchart illustrating a behavior profiling method according to some embodiments. In this example, a database configured to store operational information is accessed (102). As used herein, a database refers to a collection of data or information. It may be implemented to include a file, a directory, a registry entry, a list, a tree, a table, as well as other appropriate formats, structures or combinations thereof. The operational information includes information associated with processes in the system and their operations. For example, the operational information may include names of files or directories that are accessed by the process when the process is launched.

In some embodiments, if a process behaves normally and does not pose harm to the system, then the operations of the process are presumed to be permissible, and the operational information of the process is captured and stored to the database. The allowable behaviors may include access to certain files, system resources and/or libraries. When the process is launched again, the operational information can be used to determine behaviors that are allowable, and help prevent attempts of disallowed behavior from succeeding. A disallowable behavior may be, for example, accessing a file that has not been accessed previously by the process.

In this example, one or more allowed behaviors for a process are determined based on the operational information (104). The operational information may include information about the process's execution, such as which files are accessed by the system, the privilege level at which the process is operating, etc. The set of allowable behaviors is sometimes referred to as the behavior profile for the process. Since the operational information is stored, the behavior profile can be determined without requiring a running instance of the process. The behavior profile may be stored and used when the process is launched again.

A launched process is then monitored (106). An attempt to perform certain behavior such as loading extra components or accessing certain files is observed, and the attempted behavior is compared with one or more allowable behaviors (107). If the attempted behavior is determined to be disallowed because the attempted behavior is different from the allowable behavior(s) (108), then certain action is taken (110). The action may include preventing the disallowed behavior from succeeding, generating an event associated with the action, etc. The event generated may include sending an alert or a notification to the administrator, recording the action in a log entry, etc. If the attempted behavior is allowed, it is then completed (112) and the process continues to be monitored for further behavior attempts (106). In some embodiments, the database is monitored for changes. Method 100 is repeated when changes are detected.

Figure 2:
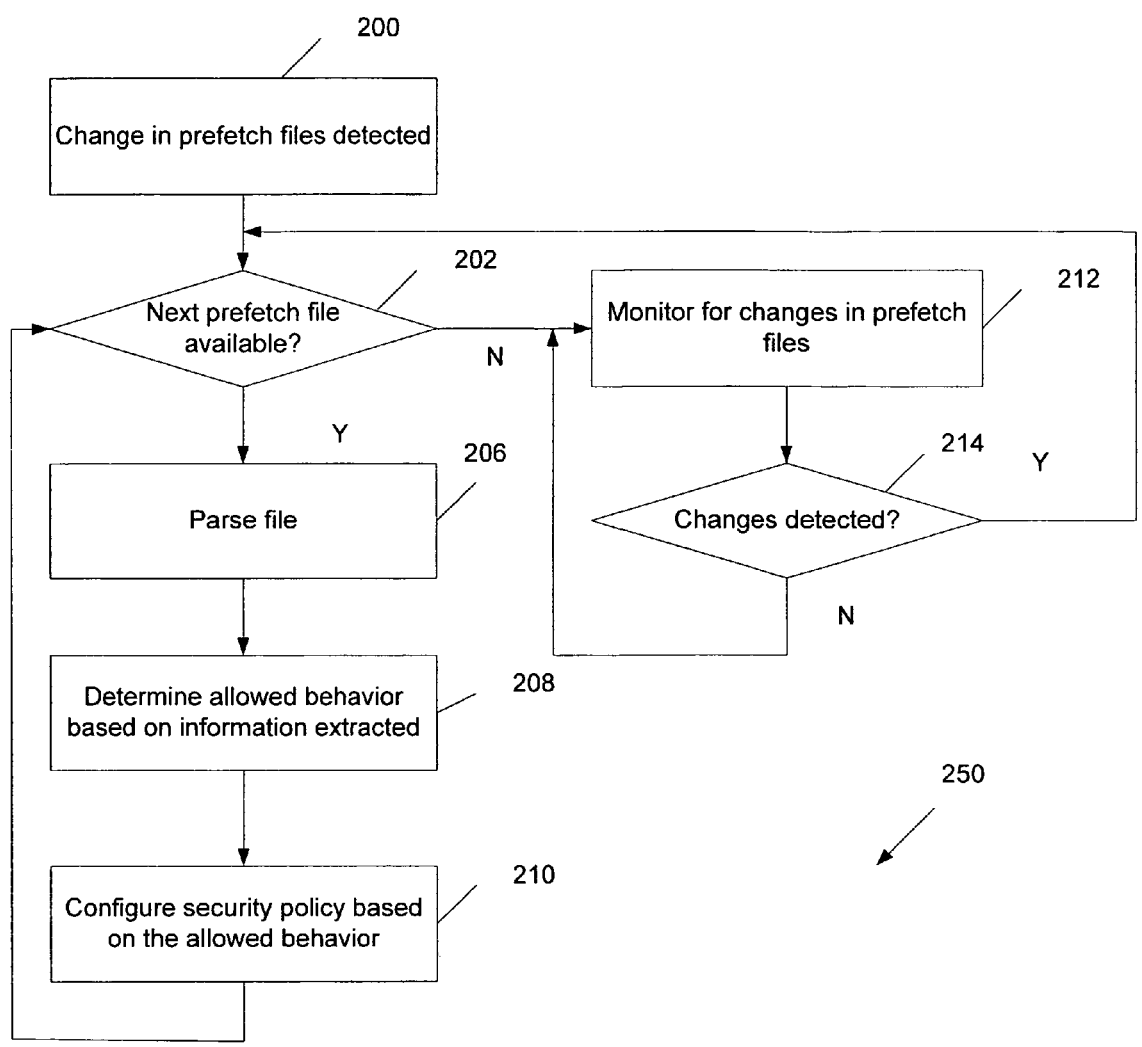
FIG. 2 is a flowchart illustrating another behavior profiling method according to some embodiments.

FIG. 2 is a flowchart illustrating another behavior profiling procedure according to some embodiments. On some systems, optimization information is maintained and used to improve various aspects of the system's operations such as system startup time, process performance, disk access, etc. Such information is used to profile the processes' behavior in some embodiments.

For example, Windows XP and Windows 2003 platforms maintain prefetch files that are used to optimize the initialization procedures of the processes. A prefetch file includes component access information such as the names and paths of various executables, directories, resources and dynamically linked libraries (DLLs) that are accessed by a process during its initialization. Based on the component access information, the system may specify and rearrange certain pages of the instruction files used during the process's initialization. Next time the process is launched, these pages are fetched from a single contiguous location on the disk. As a result, the disk access speed for retrieving these files is improved and the process's initialization time is reduced. For the purposes of example, the use of prefetch files is discussed extensively throughout the specification, although other files and other types of operational information may also be used. The techniques are applicable to Windows as well as to other operating systems such as Unix, Linux and MacOS.

In this example, method 250 is started when changes in the prefetch files have been detected (200). It is determined if a prefetch file is available for analysis (202). In some embodiments, the prefetch files are stored in a designated directory. Upon locating the directory, the prefetch files may be analyzed sequentially or in parallel. This example illustrates a sequential analysis where one prefetch file is examined at a time. If it is determined that there is a prefetch file available for analysis, then the file is parsed (206). Parsing the file includes processing it and extracting relevant information from the file. How the file is parsed may depend on the format of the file and may vary for different embodiments. For example, a prefetch file having a text format that includes multiple strings may be parsed by a string extraction utility such as strings.exe from www.sysinternals.com. A prefetch file with a binary format may be parsed by similar utilities. In some systems, the prefetch files are encrypted, therefore decryption is performed before the files are parsed.

In this example, allowable behaviors for the process are then derived based on the extracted information (208). Assuming that the process was operating in an acceptable manner at the time its component access information was recorded, the information can then be used to determine the allowable behaviors when the process is launched again in the future. In some embodiments, the allowable behaviors include accessing the components specified in the prefetch file.

Security policy based on the allowed behavior is then configured (210). In some embodiments, the policy is configured such that any behavior not configured as allowable is deemed disallowed. Events, alerts and notifications may be generated if a disallowed behavior is detected. For example, if a process attempts to load a DLL that was not specified in the prefetch file, then an alert may be generated. In some embodiments, the security policy takes into account the allowed behaviors for multiple processes. For example, if processes A and B are the only processes allowed to access component C according to the security policy, then access of component C by a process other than A or B may trigger a security event. In some embodiments, the security policy takes into account the access control information for a process. For example, the allowed behaviors may indicate that the components loaded by the process require a certain level of access control. If the process attempts to load a component that has less strict access control level, the behavior may be deemed disallowed and may cause certain actions to be taken.

The method then repeats and the next prefetch file is processed (202). When all the prefetch files are processed, the prefetch files are monitored and changes in the prefetch files are detected (212). In some embodiments that operate on Windows XP platform, the prefetch information is summarized in a file called layout.ini, which changes when the prefetch files change. By monitoring layout.ini, changes in the prefetch files can be detected. If there is change in the prefetch files, the prefetch files are then reprocessed (202); otherwise, the prefetch files are continuously monitored for changes (212).

FIG. 3 is a table illustrating the component access information included in a prefetch file example. In this example, the prefetch file includes component access information for a single process. Information for multiple processes may be included in some embodiments. The name of the example process, CMD.EXE, is shown in line 1 of the table. Lines 2-19 are the full paths and names of components accessed by the process during initialization, including executable file CMD.EXE, DLLs files NTDLL.DLL, KERNEL32.DLL, MSVCRT.DLL, USER32.DLL, GDI32.DLL, ADVAPI32.DLL and RPCRT4.DLL, resource files UNICODE.NLS, LOCALE.NLS, SORTTBLS.NLS and CTYPE.NLS, as well as several directories. According to this information, the process is allowed to access the specified components during its initialization. If the process is detected to attempt to access other components, the behavior is deemed to be suspicious and actions may be taken to prevent the attempt. Other security policies may also be configured based on the information. For example, when a patch or file update is applied, the corresponding prefetch file may change as a result of the change; therefore, the allowed behaviors as well as the actions in response to the disallowed behaviors may also change. Exception can be made when a patch or file update is applied. In some embodiments, if a behavior not configured as allowable is detected immediately after an update, it is accepted.

Figure 4:
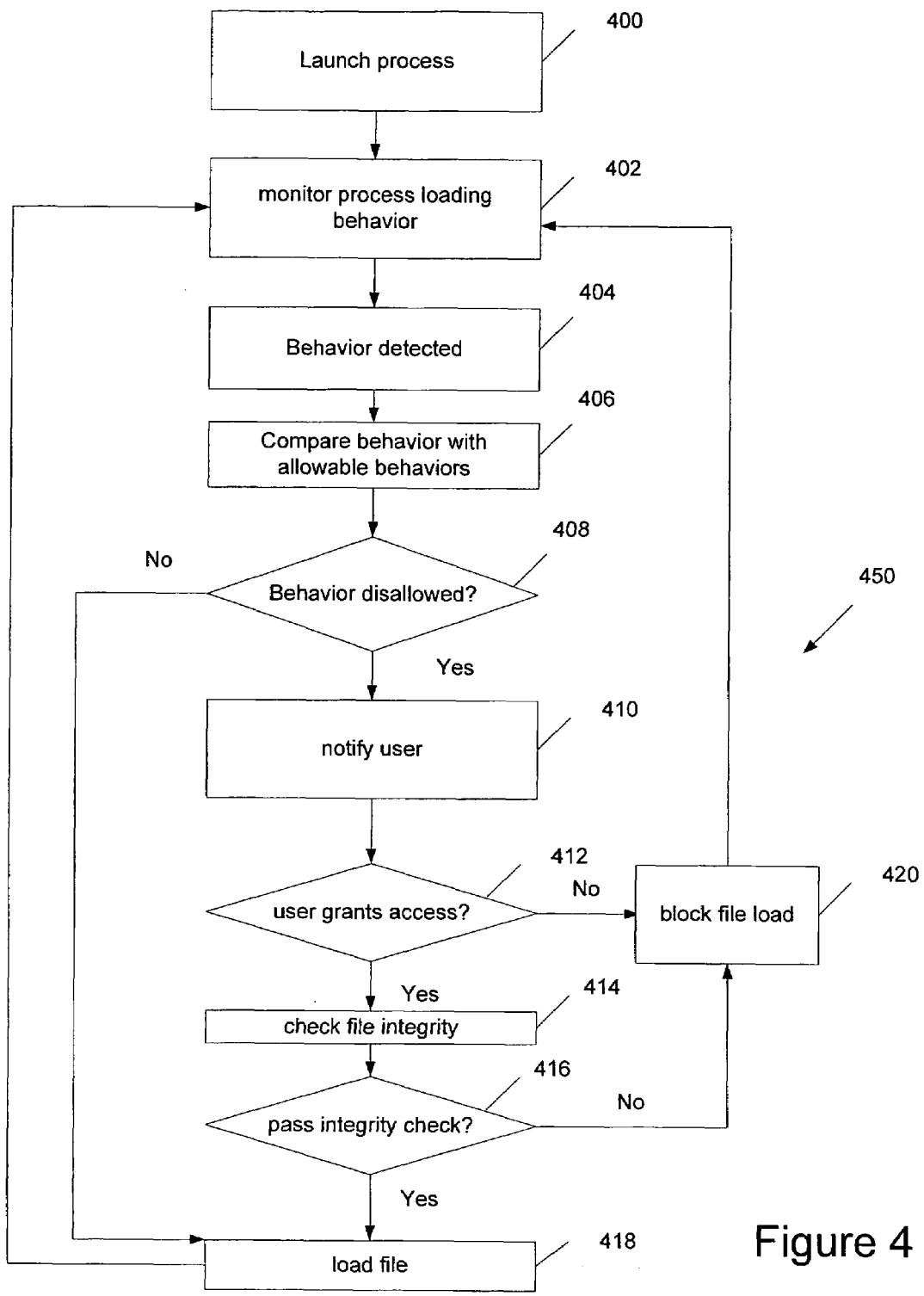
FIG. 4 is a flowchart illustrating the operations of behavior detection according to some embodiments.

FIG. 4 is a flowchart illustrating a method of behavior detection according to some embodiments. In this example, method 450 starts when the process is launched (400). The loading behavior of the process is monitored (402). In the example shown, the allowable behaviors include access to certain files on the system. Once a behavior is detected (for example, if the process is attempting to load a particular file on the system) (404), the behavior is compared with the known, allowable behaviors associated with the process (406). If the behavior matches one of the allowable behaviors, it is then deemed an allowable behavior and is completed by the process (in this example, the file is loaded by the process (418)). If, however, the behavior does not match any of the allowable behaviors, it is then determined to be a disallowed behavior (408) and the user is notified (410). In some embodiments, the user notification provides information about the process and the file it attempts to open. In some embodiments, the user notification provides a user interface that gives the user the choice to grant or deny access to the file.

Based on the user input, if access to the file is not granted (412), the process is then blocked from loading the file (420). If, however, access to the file is granted (412), the integrity of the file is then checked (414). In some embodiments, the integrity check includes applying a checksum or other appropriate signature algorithm to the file, and comparing the result with a known good value. If the result matches, then the file passes the integrity check (416) and the process proceeds to load the file (418). If the result does not match the known good value, the file does not pass the integrity check (414) and the process is blocked from loading the file (420). After the appropriate action is taken (418 or 420), the method is repeated and the process's operations are continuously monitored (402).

In some embodiments, the process is associated with multiple behavior profiles where each behavior profile delineates the allowable behaviors of the process for a certain user or a type of user. When the process is launched, its operations are monitored and compared with the allowable behaviors associated with the user context that launched the process. For example, super fetch files, such as those used in Windows Longhorn Edition can be used to associate the process with multiple behavior profiles. In some embodiments, a process can access one set of components when launched by a regular user, and a different set of components when launched by an administrator. The user based operational information stored in a superfetch file can be used to compare allowable behaviors associated with the user that launched the process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing security, comprising:
    accessing a prefetch file configured to store operational information comprising an identification of one or more resources accessed by a process during initialization of the process, which prefetch file an operating system with which the process is associated, or a component or module of the operating system, is configured to use in the event of a subsequent initialization of the process to prefetch at least one of said one or more resources prior to access to said at least one of said one or more resources being requested by the process;
    determining a first behavior using the operational information, wherein the first behavior is associated with the process;
    monitoring the process; comparing a second behavior with the first behavior, wherein the second behavior is attempted by the process; and
    performing a predetermined responsive action if the second behavior is different from the first behavior;
    wherein determining the first behavior includes parsing the prefetch file to identify the one or more resources and wherein the second behavior is determined to be different from the first behavior if the second behavior comprises an attempt by the process to access a resource not included in the one or more resources; and
    further comprising monitoring the prefetch file for changes to the prefetch file and in the event a change to the prefetch file is detected reparsing the prefetch file to determine whether any new resource in addition to the one or more resources is included in the prefetch file as changed and, in the event any such new resource is included in the prefetch file as changed determining a third behavior associated with the process, which third behavior comprises accessing said new resource and which third behavior is considered to be an authorized behavior of the process.

2. The method of providing security as recited in claim 1, in an event the second behavior is determined to be different from the first behavior, the second behavior is determined to be disallowed.

3. The method of providing security as recited in claim 1, wherein the first behavior is one of a plurality of behaviors determined using the operational information.

4. The method of providing security as recited in claim 1, wherein the first behavior is one of a plurality of behaviors determined using the operational information, and in the event the second behavior is determined to be different from the plurality of behaviors, the second behavior is determined to be disallowed.

5. The method of providing security as recited in claim 1, further comprising determining that the second behavior is disallowed.

6. The method of providing security as recited in claim 1, further comprising determining that the second behavior is disallowed and performing a predetermined action.

7. The method of providing security as recited in claim 1, wherein the predetermined action includes preventing the second behavior from succeeding.

8. The method of providing security as recited in claim 1, wherein the predetermined action includes generating an event associated with the second behavior.

9. The method of providing security as recited in claim 1, wherein determining the first behavior using the operational information is performed when the process is not operating.

10. The method of providing security as recited in claim 1, wherein the operational information includes information is used to improve process initialization time.

11. The method of providing security as recited in claim 1, wherein the operational information is configured on a per user basis.

12. The method of providing security as recited in claim 1, wherein the operational information includes component access information.

13. The method of providing security as recited in claim 1, wherein the file includes a superfetch file.

14. A system for providing security, comprising:
    a processor configured to:
        access a prefetch file configured to store operational information comprising an identification of one or more resources accessed by a process during initialization of the process, which prefetch file an operating system with which the process is associated, or a component or module of the operating system, is configured to use in the event of a subsequent initialization of the process to prefetch at least one of said one or more resources prior to access to said at least one of said one or more resources being requested by the process;

determine a first behavior using the operational information, wherein the first behavior is associated with the process;

monitor the process;

compare a second behavior with the first behavior, wherein the second behavior is attempted by the process; and perform a predetermined responsive action if the second behavior is different from the first behavior; and a memory coupled with the processor, configured to provide the processor with directions;

wherein determining the first behavior includes parsing the prefetch file to identify the one or more resources and wherein the second behavior is determined to be different from the first behavior if the second behavior comprises an attempt by the process to access a resource not included in the one or more resources; and wherein the processor is further configured to monitor the prefetch file for changes to the prefetch file and in the event a change to the prefetch file is detected reparse the prefetch file to determine whether any new resource in addition to the one or more resources is included in the prefetch file as changed and, in the event any such new resource is included in the prefetch file as changed to determine a third behavior associated with the process, which third behavior comprises accessing said new resource and which third behavior is considered to be an authorized behavior of the process.

15. A computer program product for providing security, the computer program product being embodied in a computer readable storage medium and comprising computer instructions for:

accessing a prefetch file configured to store operational information comprising an identification of one or more resources accessed by a process during initialization of the process, which prefetch file an operating system with which the process is associated, or a component or module of the operating system, is configured to use in the event of a subsequent initialization of the process to prefetch at least one of said one or more resources prior to access to said at least one of said one or more resources being requested by the process;

determining a first behavior using the operational information, wherein the first behavior is associated with the process;

monitoring the process;

comparing a second behavior with the first behavior, wherein the second behavior is attempted by the process; and performing a predetermined responsive action if the second behavior is different from the first behavior;

wherein determining the first behavior includes parsing the prefetch file to identify the one or more resources and wherein the second behavior is determined to be different from the first behavior if the second behavior comprises an attempt by the process to access a resource not included in the one or more resources; and further comprising computer instructions for monitoring the prefetch file for changes to the prefetch file and in the event a change to the prefetch file is detected reparsing the prefetch file to determine whether any new resource in addition to the one or more resources is included in the prefetch file as changed and, in the event any such new resource is included in the prefetch file as changed determining a third behavior associated with the process, which third behavior comprises accessing said new resource and which third behavior is considered to be an authorized behavior of the process.

\* \* \* \* \*

UNITED STATES PATENT AND TRADEMARK OFFICE
CERTIFICATE OF CORRECTION

PATENT NO. : 7,620,983 B1  Page 1 of 1
APPLICATION NO. : 10/802672
DATED : November 17, 2009
INVENTOR(S) : Sourabh Satish It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Twenty-sixth Day of October, 2010

David J. Kappos
*Director of the United States Patent and Trademark Office*